(12) United States Patent
Wang et al.

(10) Patent No.: US 12,201,227 B2
(45) Date of Patent: Jan. 21, 2025

(54) PRODUCT DISPLAY STAND WITH REDUCED MOVEMENT

(71) Applicant: Apple Inc., Cupertino, CA (US)

(72) Inventors: Eric Weijia Wang, Newark, CA (US);
Gregory R. Ritter, Palo Alto, CA (US); Joshua Adams, San Jose, CA (US); Olivia Ching, Austin, TX (US); Priya K. Nambiar, San Francisco, CA (US); Charles A. Schwalbach, Menlo Park, CA (US); David S. Herman, San Francisco, CA (US); John S. Camp, Los Gatos, CA (US); Samuel O. Schneider, Sacramento, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 17/805,359

(22) Filed: Jun. 3, 2022

(65) Prior Publication Data
US 2023/0389723 A1 Dec. 7, 2023

(51) Int. Cl.
*A47F 5/06* (2006.01)
*F16F 15/04* (2006.01)
*F16M 11/22* (2006.01)

(52) U.S. Cl.
CPC ............... *A47F 5/06* (2013.01); *F16F 15/04* (2013.01); *F16M 11/22* (2013.01); *F16M 2200/08* (2013.01)

(58) Field of Classification Search
CPC . A47F 5/06; F16F 15/04; F16M 11/22; F16M 2200/08; E01F 9/602; E01F 9/627; E01F 9/629; E01F 9/681; F01F 9/602; F01F 9/627; F01F 9/629; F01F 9/681
USPC .......................................................... 248/632
See application file for complete search history.

(56) References Cited

U.S. PATENT DOCUMENTS

| | | | | |
|---|---|---|---|---|
| 4,923,164 A | * | 5/1990 | Stenberg | E04H 12/2215 52/165 |
| 8,444,343 B2 | * | 5/2013 | McCue | E01F 9/629 404/9 |
| 10,077,535 B2 | * | 9/2018 | McCue | E01F 9/681 |
| 10,184,261 B2 | * | 1/2019 | Torsiello | E04H 12/2269 |
| 10,568,449 B1 | * | 2/2020 | Gathers | F21V 21/10 |
| 11,136,735 B2 | * | 10/2021 | Parrott | E01F 9/681 |
| 2016/0273175 A1 | * | 9/2016 | Intagliata | E01F 9/608 |
| 2018/0051764 A1 | * | 2/2018 | Wake | F16F 1/40 |

* cited by examiner

*Primary Examiner* — Nkeisha Smith
(74) *Attorney, Agent, or Firm* — Sterne, Kessler, Goldstein & Fox P.L.L.C.

(57) ABSTRACT

A product display stand for reducing displayed product movement can be used in a retail environment to reduce movement of a product displayed by the product display stand. Such product display stand includes a damping assembly configured to attach to a display platform. The damping assembly includes a housing configured to attach to the display platform. The housing defines a damping chamber. The assembly also includes within the chamber a damping flange and damping material. The product display stand also includes a display post fixed to the damping flange. The display post extends above the display platform and to retain and display a product.

27 Claims, 15 Drawing Sheets

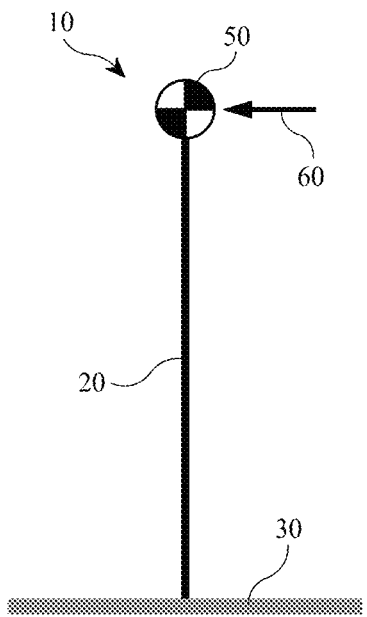
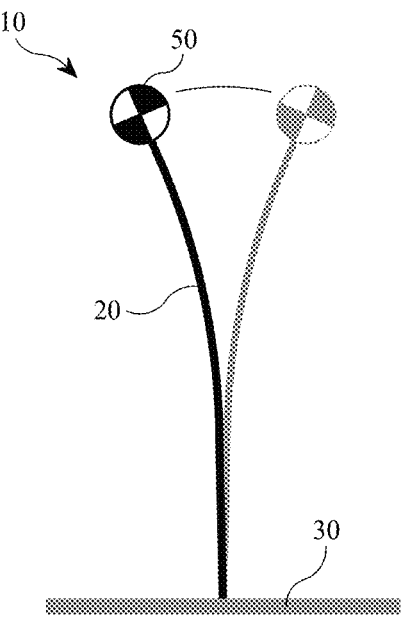
FIG. 1A
FIG. 1B
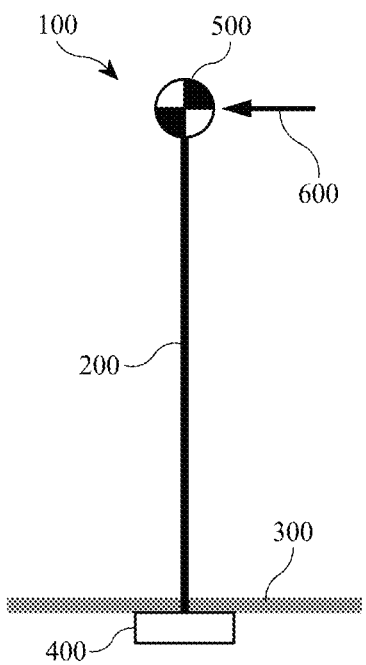
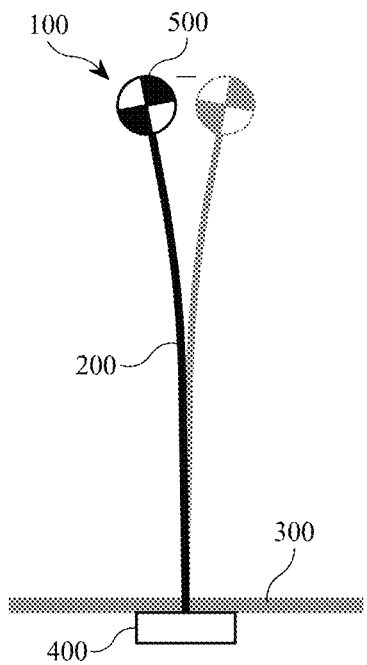
FIG. 2A
FIG. 2B

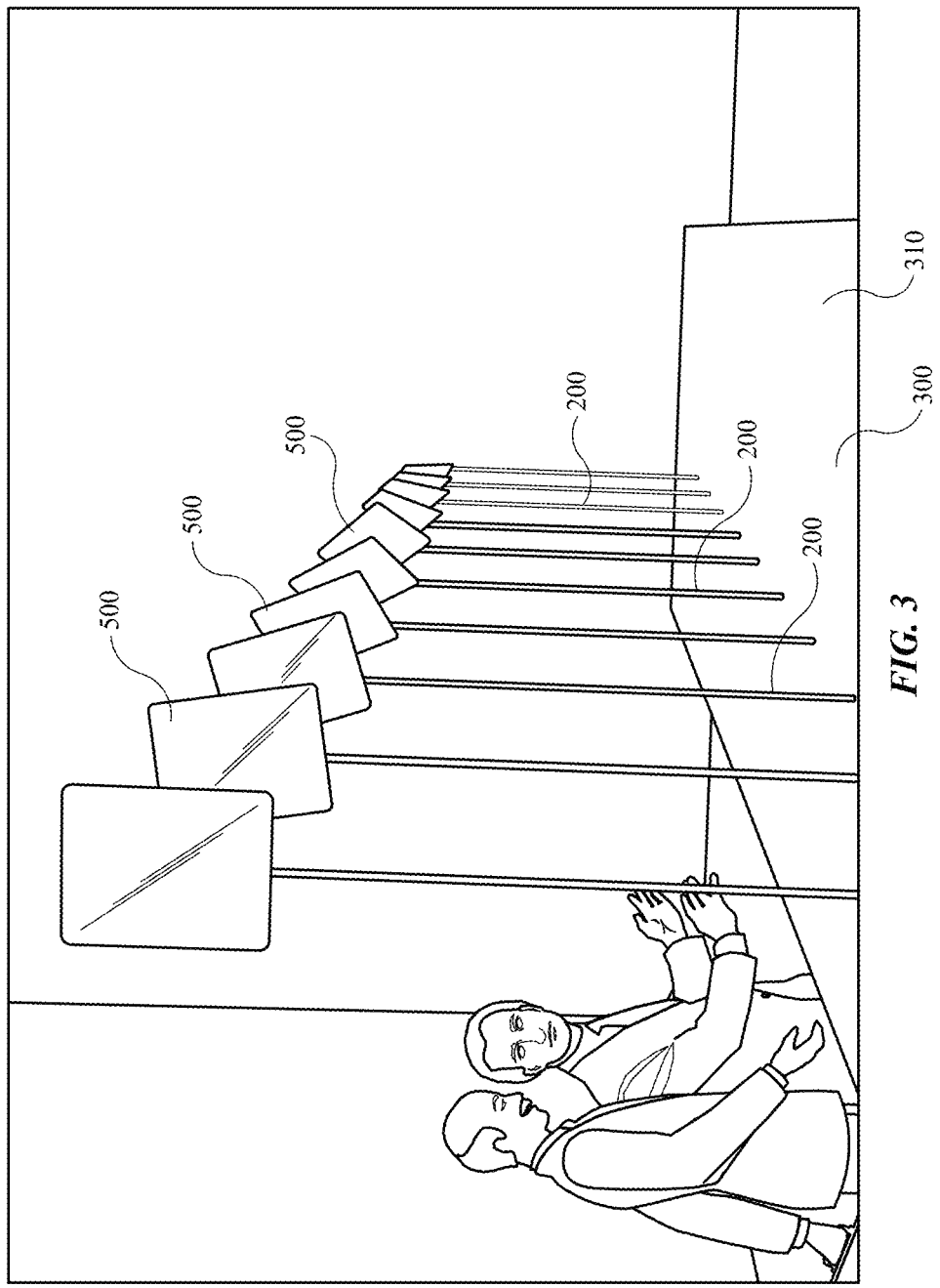

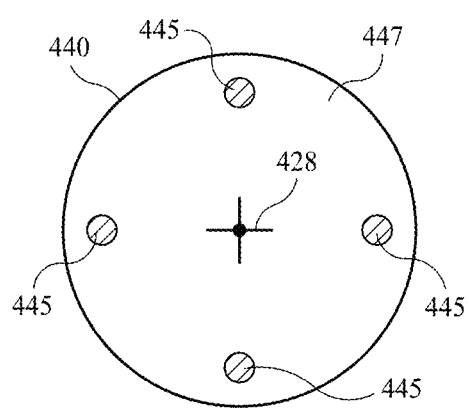 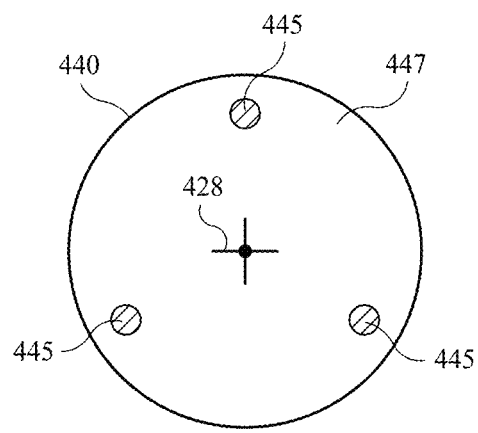
*FIG. 11A*  *FIG. 11B*

PRODUCT DISPLAY STAND WITH REDUCED MOVEMENT

FIELD

The described embodiments relate generally to product display stands. More particularly, the present embodiments relate to product display stands used in a retail environment.

BACKGROUND

Product display stands are used in retail environments, such as retail stores, or at functions displaying products for viewing by potential customers. Such display stands may hold the product above a display surface to allow for a better view of the product, or to keep the display surface free and available for other purposes.

SUMMARY

In some embodiments, a product display stand for reducing displayed product movement includes a damping assembly configured to attach to a display platform. The damping assembly includes a damping assembly housing configured to attach to the display platform, the damping assembly housing defining a damping chamber; a damping flange disposed within the damping chamber; and damping material disposed between the damping flange and walls of the damping chamber. The product display stand also includes a display post fixed to the damping flange, the display post extending from the damping flange to outside of the damping chamber, the display post configured to extend to an opposite side of the display platform and to retain and display a product.

In some embodiments, a product display system for reducing product oscillation includes a display platform defining an opening therethrough, and a display stand. The display stand includes a damping assembly disposed below a display platform at the opening, and a display post extending from the damping assembly through the display platform to a position above the display platform, the display post configured to retain a displayed item above the display platform. The damping assembly absorbs forces applied to the display post to diminish movement of the display post by transmitting the forces to foam within the damping assembly through compression of the foam.

In some embodiments a method for reducing movement of a product displayed on a display stand includes, in response to a force applied to the product, transferring the force through a display post to a damping chamber disposed below a display platform; absorbing the force by compressing resilient damping material within the damping chamber using movement of a structure disposed within the damping chamber and fixed to the display post; and repeating the absorbing step until the product is still.

BRIEF DESCRIPTION OF THE DRAWINGS

The disclosure will be readily understood by the following detailed description in conjunction with the accompanying drawings, wherein like reference numerals designate like structural elements, and in which:

FIGS. 1A and 1B show a schematic view of a product display stand with oscillation of a displayed product.

FIGS. 2A and 2B show a schematic view of a product display stand with reduced oscillation of a displayed product.

FIG. 3 show a display fixture in a retail environment having several product display stands.

FIGS. 11A and 11B show arrangements for the damping feet.

DETAILED DESCRIPTION

Figure 4:
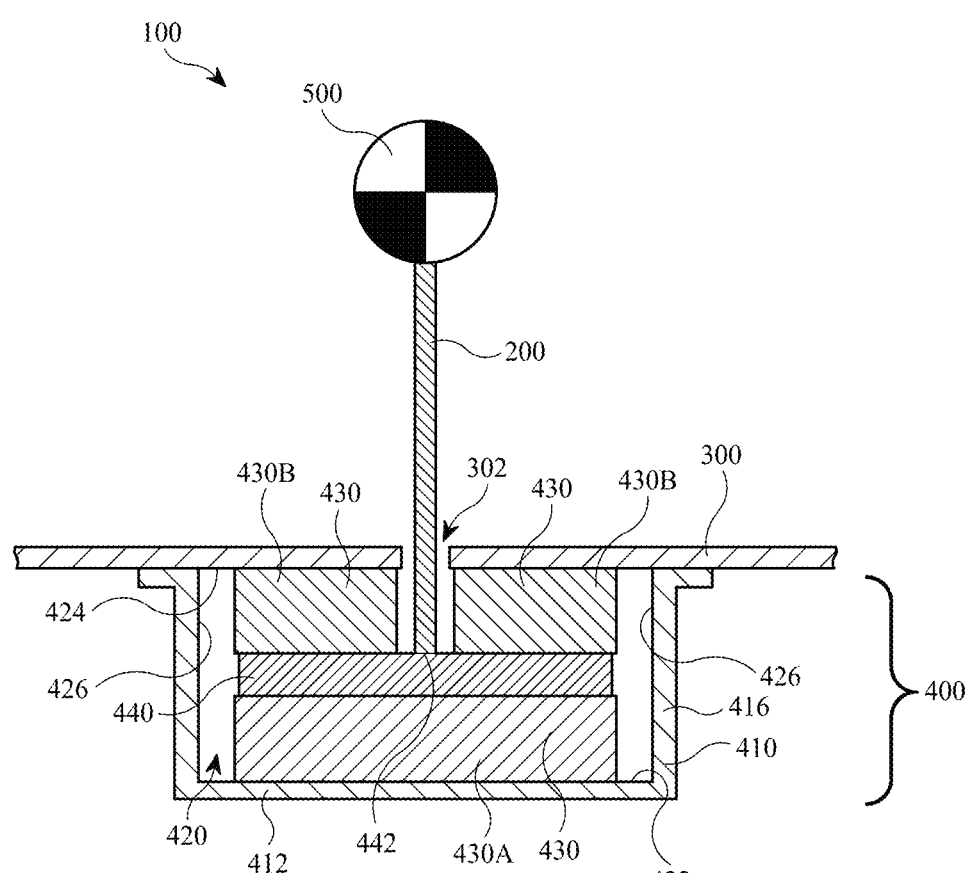
FIG. 4 shows a schematic sectional view of a display stand system for reducing movement of a displayed product.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a product display stand that reduces undesired movement, such as oscillation, in the product being displayed. Some stands have long shafts or display posts that support a product vertically above a display platform, like a display fixture in a retail setting for example. If the displayed product experiences a force applied by, for example, a customer pushing the product or bumping the display platform, the display post may flex from side to side, oscillating until the force is dissipated. Such oscillation can be of greater magnitude, and last longer, for heavy products (e.g., a laptop or tablet computer) displayed on long, thin posts.

Such oscillation may be undesirable, because it can interfere with an observer clearly viewing the product, and may make the stand appear less sturdy. It can also put more wear and tear on the stand, reducing its useful life.

In some display stand embodiments discussed herein, oscillation of a product displayed on a display post is reduced by a damping assembly, which can be a part of the display stand hidden below a display platform, and so out of sight to an observer viewing the displayed product. The display post may extend through a hole in the display platform, for example, into a damping chamber of the damping assembly. The damping chamber may contain damping material, such as resilient foam, for example. And the display post may be fixed to a damping flange also positioned within the damping chamber. When the display post moves (e.g., because of a force applied to the displayed product), the flange will also move, compressing the damping material, which absorbs some of the force, thus diminishing the motion of the damping flange, the post, and the displayed product. This makes the displayed product return to a stationary position much faster and with less movement than it would otherwise.

These and other embodiments are discussed below with reference to the accompanying figures. However, those skilled in the art will readily appreciate that the detailed description given herein with respect to these figures is for explanatory purposes only and should not be construed as limiting.

FIG. 1A shows a display stand system 10 including a display stand post 20 fixed to a display platform 30 supporting a displayed product 50. A force 60 is shown applied to displayed product 50. Force 60 may be applied, for example, directly (e.g., by a customer touching or pushing displayed product 50) or indirectly (e.g., by a customer bumping a display fixture of which display platform 30 is a part). Force 60 causes movement in displayed product 50 and display stand post 20, as shown in FIG. 1B. FIG. 1B illustrates the oscillation that displayed product 50 and display stand post 20 undergo as a result of force 60. Such oscillation will occur back and forth until the applied force is dissipated, at which point displayed product 50 will return to a stationary position (e.g., as shown in FIG. 1A). Such oscillation can have a high magnitude (i.e., maximum horizontal distance moved), and can take a long time and many oscillations to return to a stationary position.

The magnitude and time of oscillation can be greater for a heavier displayed product 50. As it moves farther from a vertical position of display stand post 20 (e.g., from display stand post 20 flexing, tilting, or both flexing and tilting) the weight of displayed product 50 can apply torque to display stand post 20, exacerbating its oscillation.

FIG. 2A shows a display stand system 100 including a display stand post 200 extending above a display platform 300. Display stand post 200 is coupled to a damping assembly 400 of display stand system 100 according to some embodiments. Display stand post 200 supports a displayed product 500. Force 600 may be applied to displayed product 500 in the same manner as described above for force 60. As with display stand system 10, force 600 causes movement in displayed product 500 and display stand post 200, as shown in FIG. 2B. However, damping assembly 400 reduces the oscillation that displayed product 500 and display stand post 200 undergo as a result of force 60. Such oscillation will stop and the applied force will be dissipated through damping assembly 400 much more quickly than in display stand system 10. Thus, relative to display stand system 10 without a damping assembly, such oscillation of displayed product 500 has a lower magnitude and takes a shorter time and fewer oscillations to return to a stationary position (e.g., as shown in FIG. 2A).

FIG. 3 shows a display fixture 310 forming display platform 300, with several display stand systems 100 displaying products 500 above display platform 300. As can be appreciated in FIG. 3, such long, thin display stand posts 200 provide a clean, elegant way to display products. They also leave display platform 300 free for other uses. Products 500 displayed on such long, thin display stand posts 200—especially heavy products—however could oscillate in the manner described above, which could give an undesirable appearance of motion or instability. A damping assembly 400 as described herein reduces such oscillation and returns product 500 to a stationary position faster and with less oscillation than would occur otherwise. Such benefits as described are not limited only to long, thin posts, but are in some implementations particularly evident in this context.

FIG. 4 shows a schematic view with more detail of display stand system 100. As shown, display stand system 100 includes a display stand including display post 200 and damping assembly 400. In the illustrated embodiment, display stand system 100 also includes display platform 300. Display stand system 100 may also include displayed product 500.

Damping assembly 400 may be coupled to display platform 300. For example, as shown, damping assembly 400 may be attached to an underside of display platform 300, opposite the side of display platform 300 above which displayed product 500 is displayed. Display post 200 may extend from damping assembly 400 through an opening 302 of display platform 300, to an opposite side of display platform 300 as the side at which damping assembly 400 is coupled. Opening 302 may be slightly larger (e.g., have a greater diameter) than display post 200 to allow for movement of display post 200. In this configuration damping assembly 400 is not visible from above display platform 300, thereby effecting its damping without affecting the displayed appearance of display stand system 100.

Damping assembly 400 may be removably coupled to display platform 300 (e.g., using bolts, screws, or other removable fastener) or it may be permanently affixed to display platform 300 (e.g., using a permanent adhesive or other permanent fastening technique).

As shown in FIG. 4, damping assembly 400 includes a damping assembly housing 410 forming a damping chamber 420. Damping chamber 420 houses damping material 430 and a damping flange 440.

Damping assembly 400 may be coupled to display platform 300 via a connection between damping assembly housing 410 and display platform 300. Damping chamber 420 within damping assembly housing 410 may be defined by a bottom surface 422, a top surface 424, and one or more side surfaces 426. As shown, bottom surface 422 is formed by bottom wall 412 of damping assembly housing 410, top surface 424 is formed by display platform 300, and side surface 426 is formed by side wall 416 of damping assembly housing 410. Additionally or alternatively, other structure may define damping chamber 420. For example, damping assembly 400 may have an upper wall that forms top surface 424, or there may be intermediate elements between damping assembly housing 410 and/or display platform 300 and damping chamber 420 that define damping chamber 420. In some embodiments, damping chamber 420 is closed, as shown in FIG. 4. In other embodiments damping chamber may be more open, for example without side surfaces, and/or with openings through its surfaces.

As shown in FIG. 4, damping flange 440 is positioned vertically between solid damping material units 430. In other words, in a height direction (e.g., the direction in which product display post extends), a first damping material unit 430A (e.g., an upper damping material unit) is disposed below and in contact with damping flange 440, and a second damping flange is disposed above and in contact with damping flange 440. Display stand system 100 is shown as a schematic section view in FIG. 4.

Display stand system 100 may have rotational symmetry about product display post 200, such that the portions of a second damping material unit 430B (e.g., a lower damping material unit) are portions of the same continuous damping material unit, having an annular shape in plan view. Likewise, first damping material unit 430A may have a circular or annular shape in plan view, and flange 440 may have a circular shape in plan view. Such circular shapes can allow damping assembly 400 to dampen oscillation in any direction. However, other shapes may be used for various reasons, including to tailor the degree or direction of oscillation while damping.

Damping material 430 may be a compressible, resilient material. In some embodiments, damping material 430 is a solid, resilient foam (e.g., EVA (ethylene-vinyl acetate) foam, PEVA (poly-ethylene-vinyl acetate) foam) or foam-like material (e.g., synthetic rubber such as neoprene).

In some embodiments, damping material 430 is more compressible and flexible than the material from which damping flange 440 is formed. Damping flange 440 is rigid and inflexible.

As shown in FIG. 4, damping flange 440 is sandwiched between damping material units 430, which hold damping flange 440 in place within damping chamber 420. In some embodiments, damping flange 440 is not directly attached to display platform 300, but is only indirectly attached through its retention within damping chamber 420. In some embodiments, damping flange 440 is not coupled to damping assembly 400 except through contact with damping material 430. This can help isolate movement of damping flange 440 from display platform 300 for more effective absorption of energy by damping material 430.

Damping flange 440 extends horizontally in a width direction between damping material units 430. Product display post 200 is fixed to damping flange 440. In some embodiments, a connection 442 between damping flange 440 and product display post 200 does not allow for relative motion between damping flange 440 and product display post 200 at connection 442 in normal use (i.e., connection 442 is a rigid connection). For example, in some embodiments damping flange 440 is fixed to product display post 200 by a reversible mechanical connection such as a bolt or collet mechanism. Alternatively, in some embodiments damping flange 440 is permanently coupled to product display post 200 (e.g., by welding), and in some embodiments damping flange 440 is unitary with product display post 200.

Figure 5A:
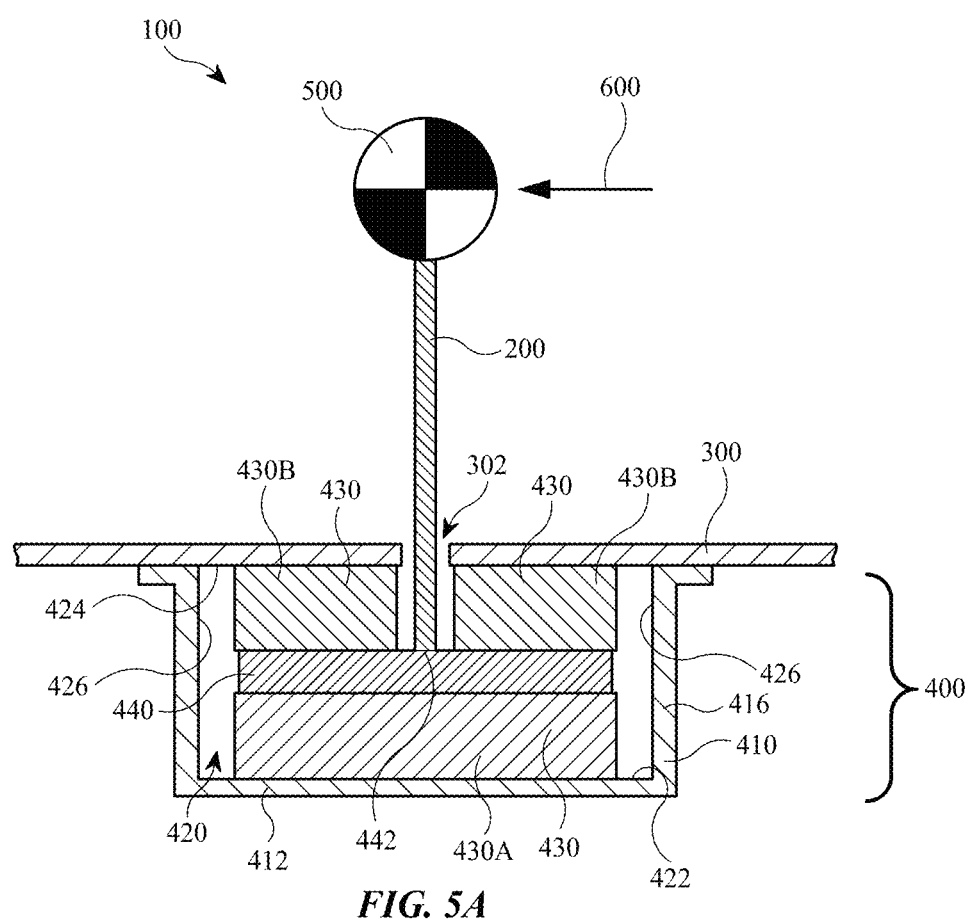
FIGS. 5A-5D show the display stand system of FIG. 4 operating to reduce movement of a displayed product.
Figure 5B:
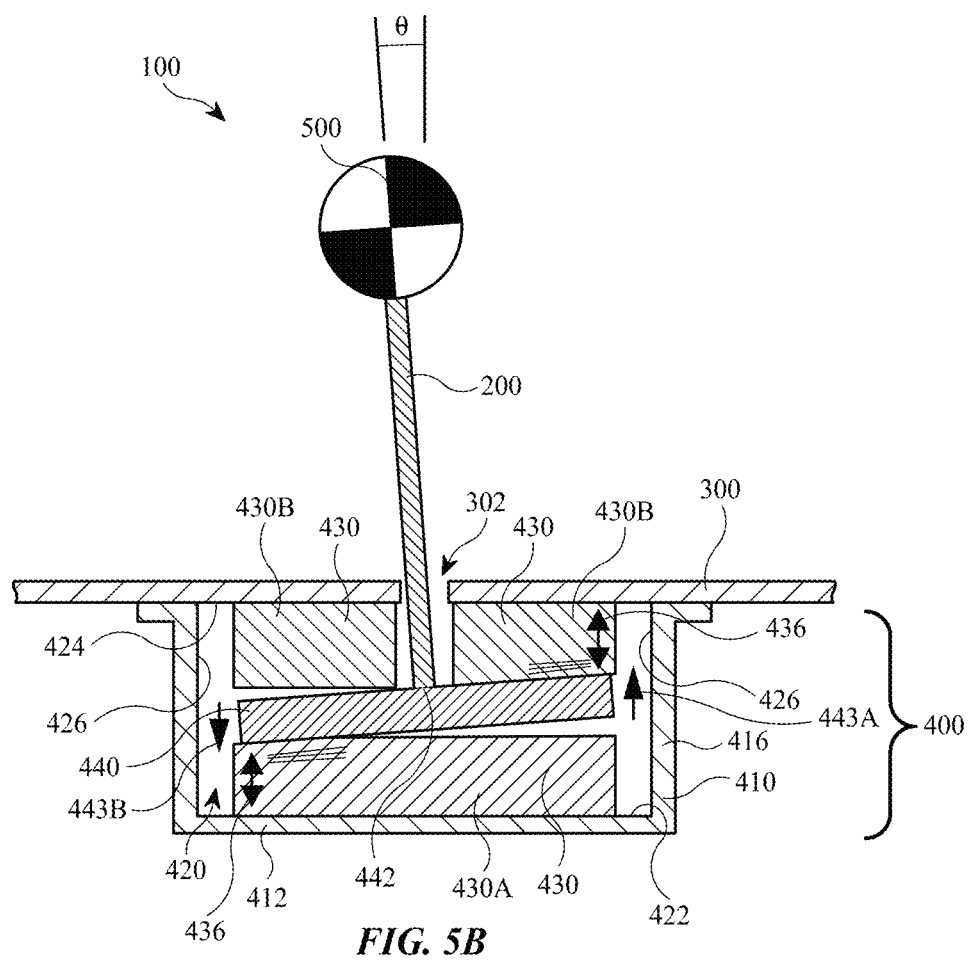

Referring to FIG. 5A, due to connection 442 between product display post 200 and damping flange 440, a motion (e.g., a horizontal motion) of displayed product 500 oscillating above display platform 300 (e.g., due to a force 600 applied to displayed product 500 or product display post 200) will cause a tendency toward corresponding perpendicular motion (e.g., vertical motion) at ends of damping flange 440, shown in FIG. 5B. As shown in FIG. 5B, motion of displayed product 500 in a first horizontal direction (left in FIG. 5B) causes corresponding vertical motion of the ends of damping flange 440 (upward motion 443A of the right side of damping flange 440 and downward motion 443B of the left side of damping flange 440). But because damping material 430 sandwiches damping flange 440 within damping chamber 420, such vertical motion serves to compress damping material 430, thereby absorbing some of the force caused by the oscillation of displayed product 500, thereby counteracting and diminishing the oscillation (e.g., in terms of amplitude and time).

The longer and thinner that product display post 200 is for a given weight of displayed product 500, the greater the potential magnitude and duration of motion of displayed product 500, and thus the greater impact and effect that damping assembly 400 can have to reduce such motion. In some embodiments, product display post 200 is at least 50 times longer than an average diameter of display post (e.g., at least 100 times longer).

As displayed product 500 reaches the maximum extent of its motion in one direction, it may spring back in a second horizontal direction (right in FIG. 5B) opposite of the first horizontal direction. This may be due in part to energy and flexibility remaining in displayed product 500, product display post 200, and damping flange 440. As damping material 430 compresses it reaches a maximum compression from flange 440 and pushes back 436 against flange 440 until flange 440 stops pressing against damping material 430 and begins moving in an opposing direction. In continuing its oscillation in this way (e.g., due to resiliency of display post 200), displayed product 500 may overshoot its stationary position (e.g., centered over post 200) and move toward a maximum extent of motion in the opposing direction (see FIG. 5C). Due to the absorption of force by damping material 430 described with reference to FIG. 5B, the maximum extent of motion in the second horizontal direction (shown in FIG. 5C) is diminished relative to the maximum extent of motion in the first horizontal direction (shown in FIG. 5B). This is represented by the decrease in an angle θ of deviation from a stationary position.

Figure 5C:
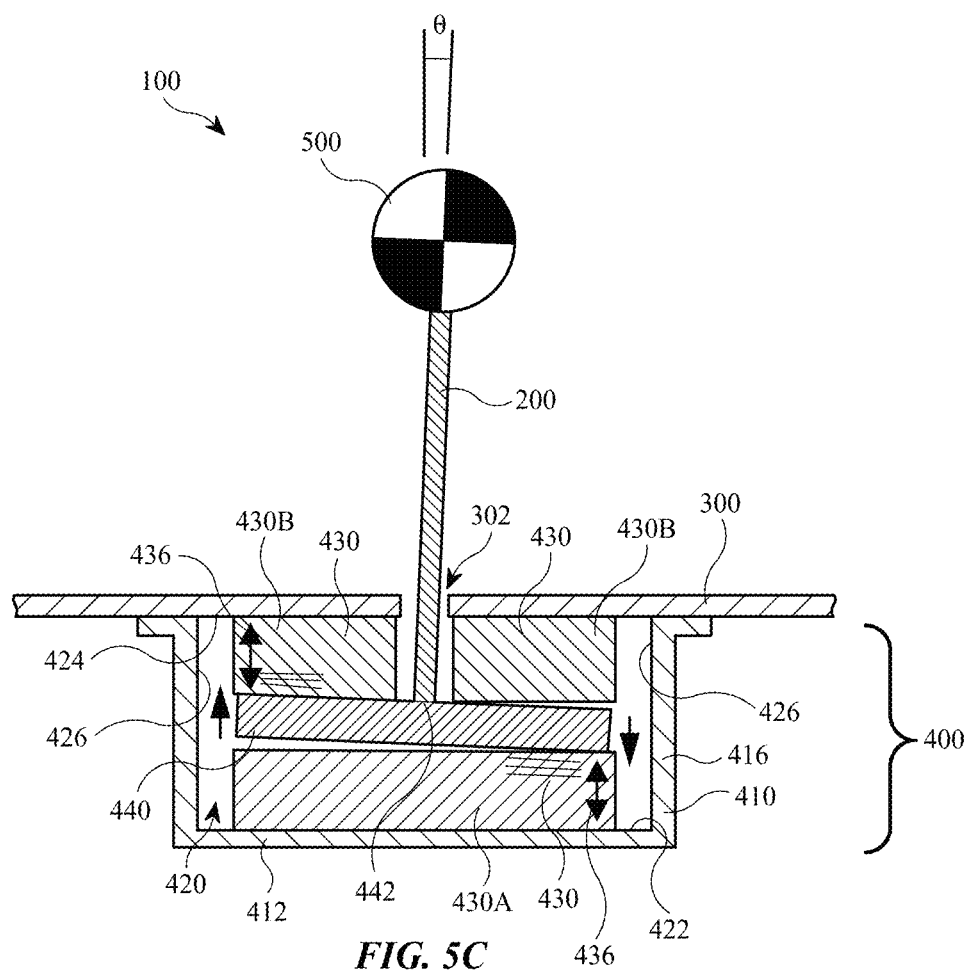
Figure 5D:
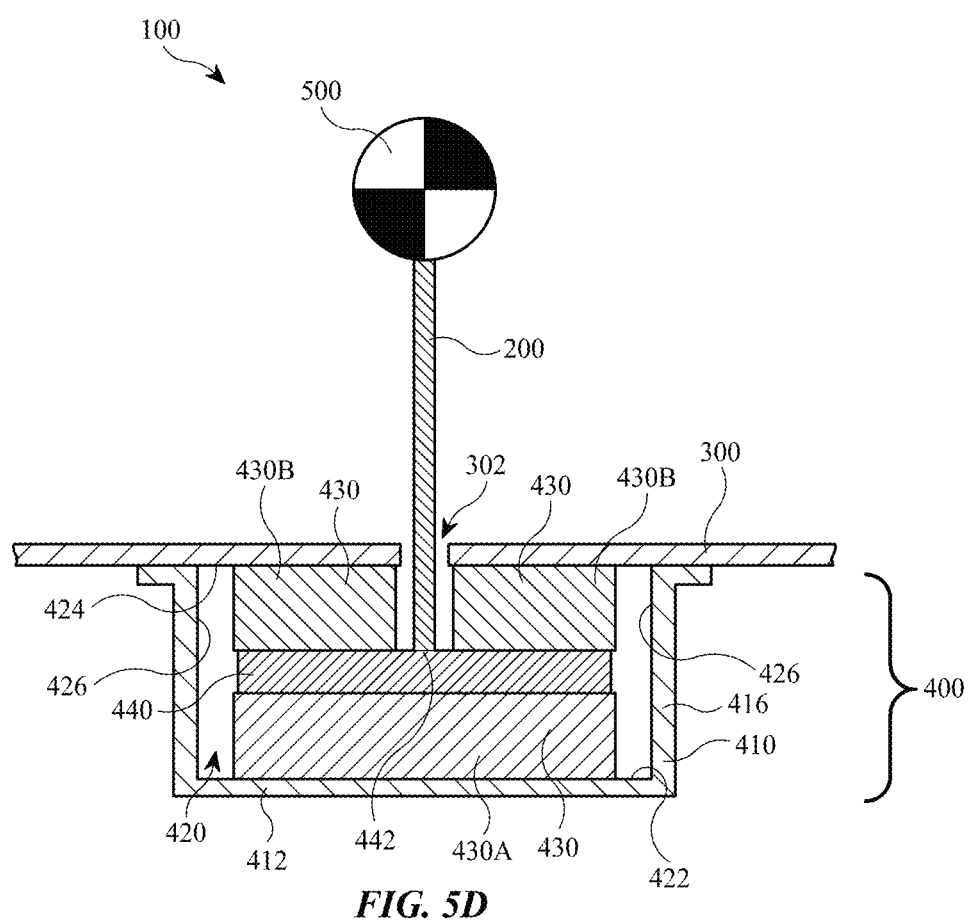

Damping flange 440 and damping material 430 may operate similarly in response to the horizontal motion of displayed product 500 in the second horizontal direction as described above for the first horizontal direction, just compressing damping material 430 on opposing sides, as shown in FIG. 5C. This process may repeat back and forth, diminishing oscillation of product 500 each time until product 500 (and the rest of product display system 100) are stationary as shown in FIG. 5D.

Put another way, display stand system 100 provides a method for reducing movement of displayed product 500 displayed on product display post 200. For example, in response to a force applied to displayed product 500 (or product display post 200), the force is transferred through display post 200 to damping chamber 420 disposed below display platform 300. The force is absorbed by compressing resilient damping material 430 within damping chamber 420 using movement of a structure disposed within damping chamber 420 (e.g., damping flange 440) and fixed to product display post 200. Such absorption by compression repeats—at alternating positions of the damping material 430—until displayed product 500 is still.

As described, such repeating absorption by compression involves first compressing a first portion of damping material 430 (e.g., portion 432) and simultaneously compressing a second portion of the damping material 430 (e.g., portion 434), the second portion being compressed in a direction parallel to and opposite of the direction in which the first portion is compressed. Next, such repeating absorption by compression involves compressing a third portion of damping material 430 and simultaneously compressing a fourth portion of damping material 430, the fourth portion being compressed in a direction parallel to and opposite of the direction in which the third portion is compressed.

Directions are discussed herein in terms of horizontal and vertical for clarity of description with reference to the figures, but it should be appreciated that display stand system could operate similarly in a different orientation. Further, though some motions and directions of displayed product 500, product display post 200, and damping flange 440 may be described in terms of horizontal and vertical, it is recognized that their overall movement may be more complex and somewhat rotational, with both horizontal and vertical components. The terms horizontal and vertical are used in reference to the predominant component direction of the described motion, for clarity of description with reference to the figures.

As shown in FIGS. 5B and 5C, compression of damping material 430 occurs in different, alternating positions of damping material 430. This gives compressed material in one position time to resiliently return to its pre-deformed state before being compressed again, thereby most effectively dissipating force and reducing oscillation. For clarity of description this motion and oscillation is shown and described in two dimensions, but it should be apparent that it can occur in three dimensions, with the described portions of display stand system 100 extending all around display post 200 (e.g., in a circular configuration), and with the positions of compression of damping material 430 moving to correspond to the motion of oscillation of product 500 as it is transferred down display post 200 and through damping flange 440.

In some embodiments, a total height of damping material 430 (e.g., damping material units 430A and 430B together) in and damping flange 440 together is equal to a total height of damping chamber 420. In some embodiments this is the case when damping material is unloaded (i.e., not undergoing compression from damping assembly 400).

In some embodiments, damping material 430 may be pre-loaded within damping chamber 420. In other words, even when product display system 100 is in a stationary configuration, without movement of displayed product 500, damping material 430 may be compressed (relative to a free state) within damping chamber 420, by walls of damping chamber 420. For example, damping material unit 430A may be compressed between damping flange 440 and bottom surface 422 of damping chamber 420, and damping material unit 430B may be compressed between damping flange 440 and top surface 424 of damping chamber 420. To effect this pre-loading, a total height of damping material 430 (e.g., damping material units 430A and 430B together) in an unloaded configuration and damping flange 440 together may be greater than a total height of damping chamber 420. This allows damping chamber 420 to compress damping material 430 against damping flange 440 within damping chamber 420. This helps keep damping flange 440 and product display post 200 stationary and not prone to wobbling. It also improves the effectiveness of damping material 430 in absorbing and dissipating forces and associated oscillation of displayed product 500.

Figure 6A:
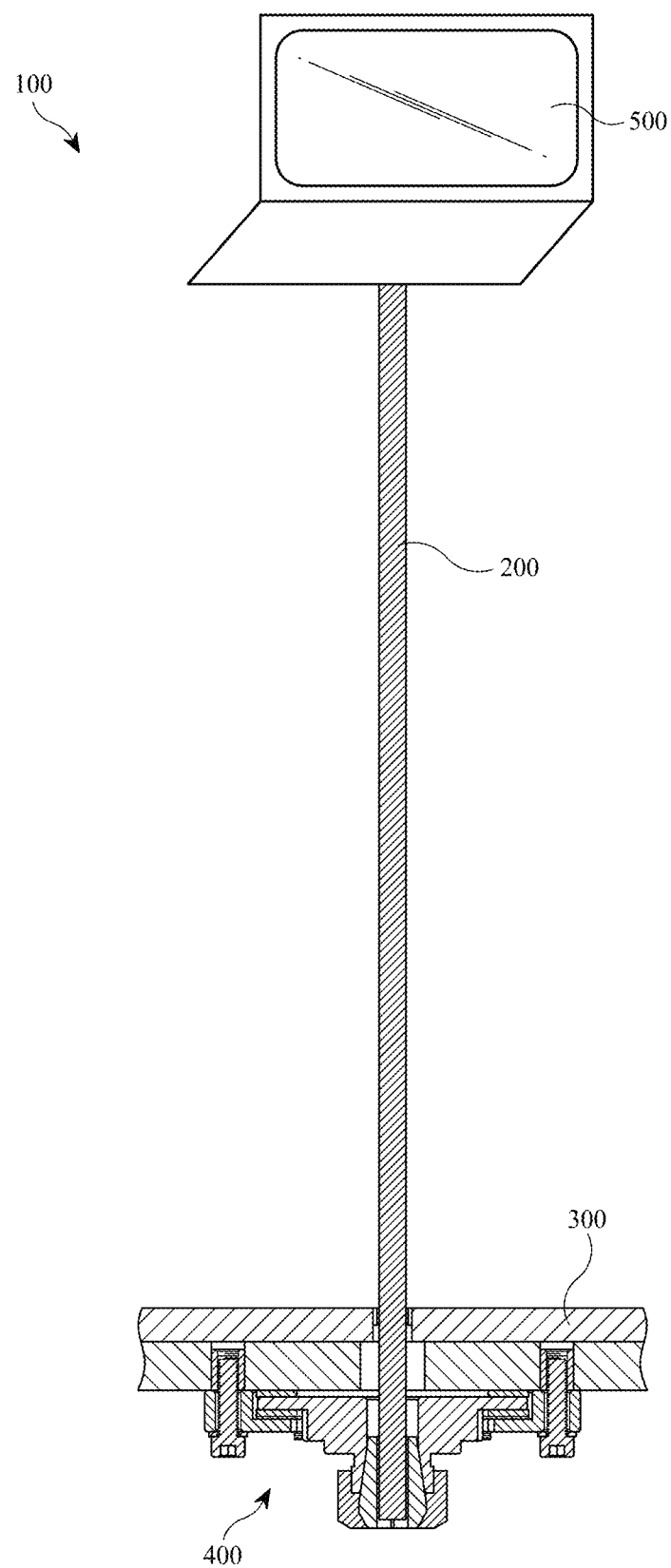
FIG. 6A shows a detailed sectional view of a display stand system for reducing movement of a displayed product.
Figure 6B:
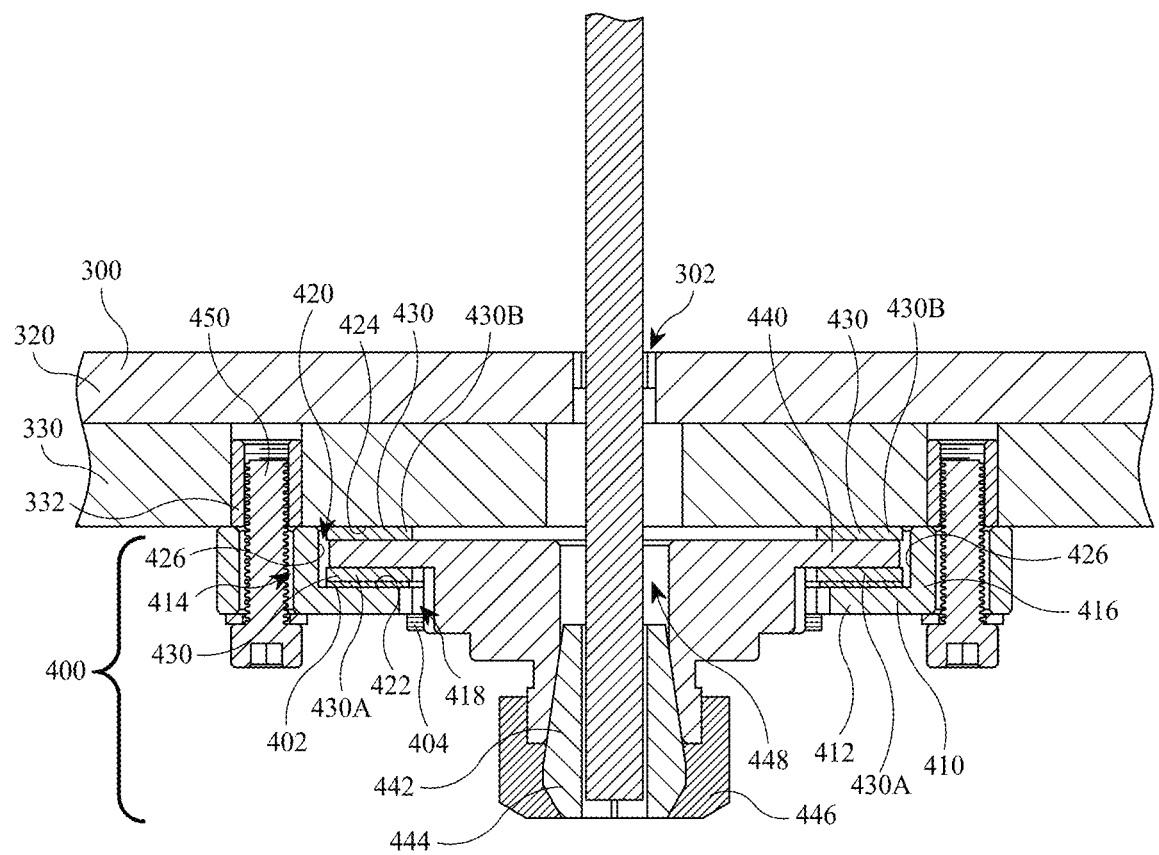
FIG. 6B shows an enlarged view of a portion of FIG. 6A.
Figure 6C:
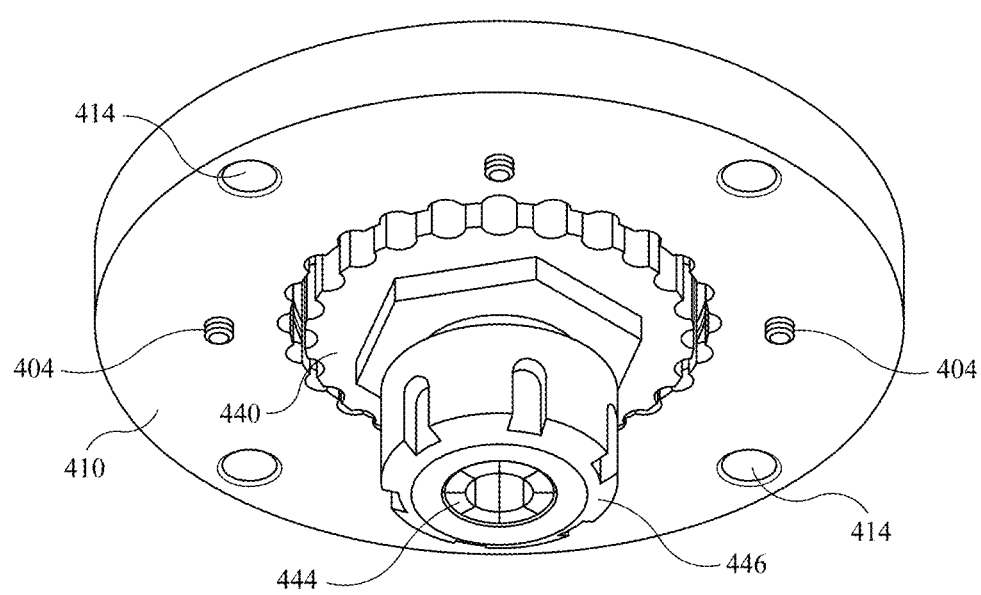
FIG. 6C shows perspective view of a portion of FIG. 6B.
Figure 7A:
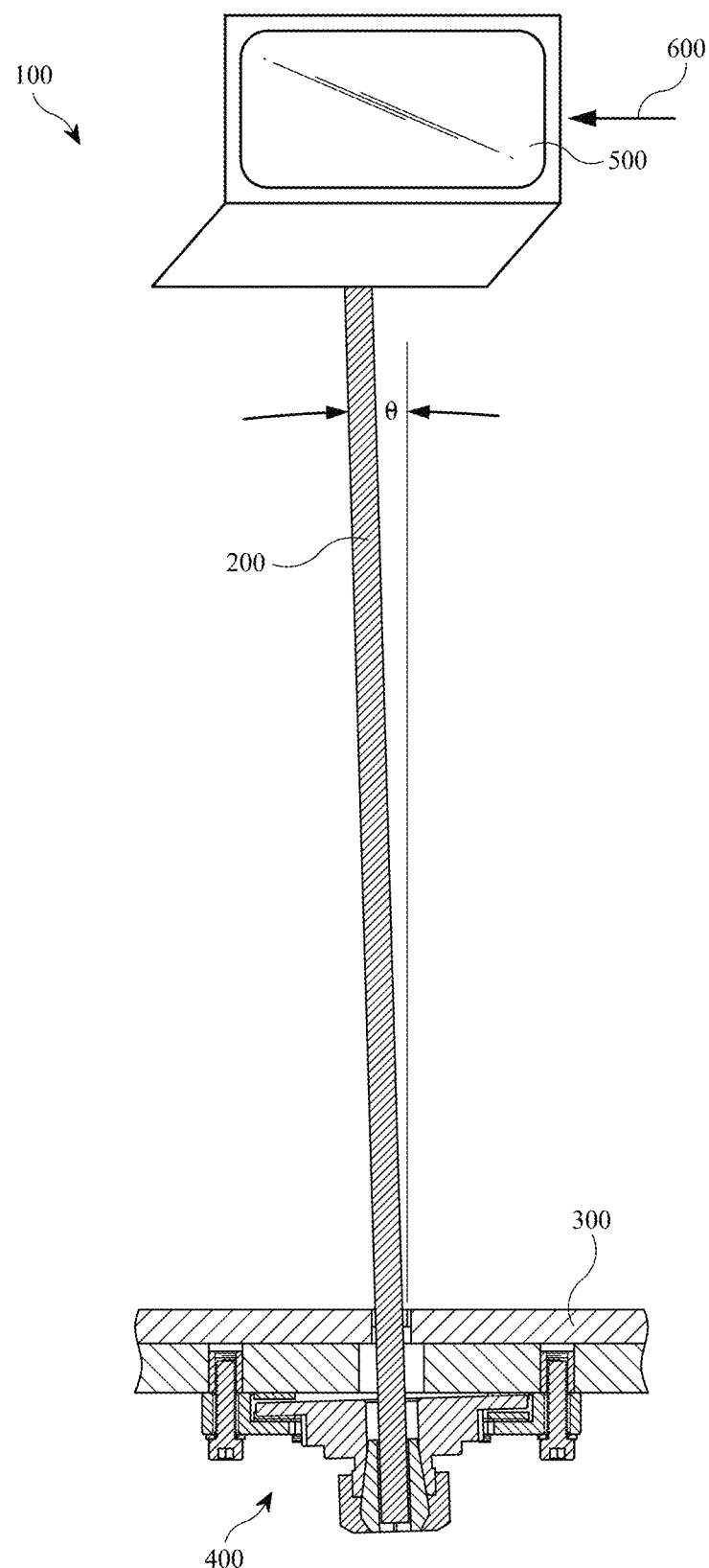
FIG. 7A shows a detailed sectional view of the display stand system of FIG. 6A in motion.
Figure 7B:
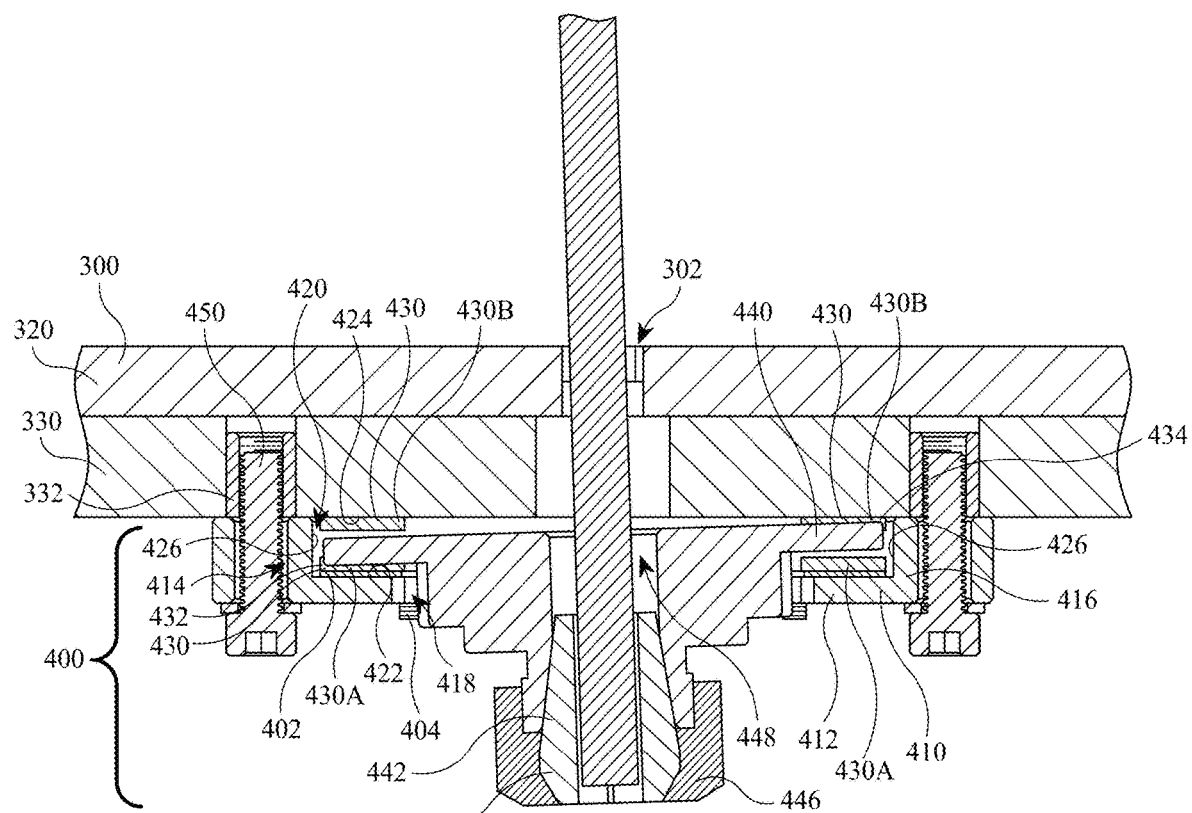
FIG. 7B shows an enlarged view of a portion of FIG. 7A

FIGS. 6A-6C, 7A, and 7B show product display stand system 100 in more detail. FIGS. 6A and 6B are central cross-sectional views and correspond to a state of display stand system 100 in which displayed product 500 is stationary, like in FIG. 5D, discussed above. FIGS. 7A and 7B are also central cross-sectional views (taken at the same plane as FIGS. 6A and 6B) and correspond to a state of display stand system 100 in which displayed product 500 is in motion (e.g., oscillating), like in FIGS. 5B and 5C, discussed above. The description relating to FIGS. 5A-5D above applies to display stand system 100 as shown in FIGS. 6A-6C, 7A, and 7B. And the description relating to FIGS. 6A-6C, 7A, and 7B applies to display stand system 100 as shown in FIGS. 5A-5D.

FIG. 6A shows display stand system 100, FIG. 6B shows an enlarged view of a lower portion of display stand system 100, and FIG. 6C shows an enlarged lower perspective view of certain parts of display stand system 100.

As shown in FIG. 6B, in some embodiments, damping assembly housing 410 may be coupled to display platform 300. For example, damping assembly housing 410 may be coupled to an underside of display platform 300 via fasteners 450 (e.g., bolts 450) passed through openings 414 in damping assembly housing 410 and threaded into receptacles 332 (e.g., threaded inserts 332) of display platform 300. In some embodiments display platform 300 may be formed of an upper layer 320 and a lower layer 330. While opening 302 extends entirely through display platform 300 (including through both layers 320 and 330), fastening mechanisms for fastening damping assembly housing 410 to the underside of display platform 300 may only extend into lower layer 330 (or at least not above the top surface of display platform 300 or upper layer 320).

As shown, such bolts 450 and openings 414 are outside damping chamber 420 and so do not interfere with the operation of damping assembly 400 as discussed above. Additionally or alternatively, damping assembly housing 410 may be coupled to display platform 300 using other mechanisms such as, for example, other mechanical fasteners or coupling mechanisms or adhesive.

In some embodiments, damping assembly housing 410 includes a lower opening 418. Opening 418 may be accessible from an exterior of damping assembly 400 when damping assembly is installed and coupled to display platform 300. Opening 418 may be centered in bottom wall 412 of damping assembly housing 410. In some embodiments, a lower end of product display post 200 may be accessible through opening 418. This can enable a user to service or make changes to display stand system 100 while it is still installed. For example, in some embodiments product display post 200 can be coupled to or decoupled from damping flange 440 through opening 418, or the height or rotation of product display post can be adjusted.

In embodiments having opening 418, bottom surface 422 of damping chamber extends around the periphery of opening 418, with damping material 430 and portions of damping flange 440 disposed above it as described above and shown, for example, in FIG. 6B.

Damping flange 440 may have a maximum width (e.g., diameter) that is less than an interior width of damping chamber 420 such that it fits inside damping chamber 420 without touching side surfaces 426 of damping chamber 420. In embodiments having opening 418, damping flange 440 has a maximum width (e.g., diameter) that is greater than a width (e.g., diameter) of opening 418, such that it cannot fit through opening 418. In this way, damping flange 440 and damping material 430 remain in the stacked arrangement described above and shown in FIG. 6B (e.g., sandwiched together with damping material 430 arranged above and below damping flange 440 and in contact with interior surfaces of damping chamber 420).

Damping flange 440 may include an attachment mechanism 444 for attaching to product display post 200, which acts as connection 442 to fix damping flange 440 to display post 200 as described above. In some embodiments, as shown in FIG. 6B for example, attachment mechanism 444 is a collet that receives product display post 200 and is tightened around and fixed to display post 200 by collet nut 446. In such embodiments where attachment mechanism 444 is on a lower side of damping flange 440 (as shown in FIG. 6B), damping flange 440 may include a hole 448 therethrough (e.g., centered, as shown in FIG. 6B) through which display stand post 200 can pass to reach attachment mechanism 444. Alternatively product display post 200 may be coupled to display flange in other manners as described above. For example, product display post 200 may be fixed to damping flange by a threaded connection (e.g., a threaded end of display post 200 may be received by a threaded hole of damping flange 440), a weld, or other connection mechanism.

In some embodiments damping flange may have a protruding portion 441 extending downward and through opening 418 such that the entirety of damping flange is not disposed within damping chamber 420. Protruding portion 441 may have a shape corresponding to a shape of opening 418 but slightly smaller, so that protruding portion 441 can protrude through opening 418. In some embodiments, when damping flange 440 is centered within damping chamber 420, a minimum distance between protruding portion 441 and a side of opening 418 is less than a minimum distance between an end of damping flange 440 and an interior side surface 426 of damping chamber 420, which can help prevent damping flange 440 from contacting interior side surface 426 within damping chamber 420.

Damping material 430 can take a variety of configurations, as will be explained in more detail below. In FIG. 6B, damping material 430 is formed of two damping material units 430: first damping material unit 430A disposed beneath damping flange 440, and second damping material unit 430B disposed above damping flange. In the illustrated embodiment, both damping material unit 430A and damping material unit 430B are annular, forming a ring shape (seen in cross-section in FIG. 6A and FIG. 6B). As discussed above, damping material 430 may be a resilient foam or foam-like material.

In some embodiments, damping assembly 400 includes a damping leveler plate 402 disposed between bottom wall 412 of damping assembly housing 410 and first damping material unit 430A. Damping leveler plate 402 may be a rigid flat element (e.g., metal or a hard polymer) and in embodiments in which it is included damping leveler plate 402 may form an interior surface of damping chamber 420 (e.g., bottom surface 422). Damping leveler plate may be supported on bottom wall 412 directly or via leveler posts 404 (e.g., adjustment screws, such as set screws) that can be adjusted up or down relative to bottom wall 412 to thereby adjust the angle at which damping flange 440 rests within damping chamber 420. This can allow the angle of product display post 200 to be adjusted if needed (e.g., to make sure that its stationary position is vertical).

FIGS. 7A and 7B show display stand system 100 in an active state, where displayed product 500 is in motion (e.g., oscillating), swaying above display platform 300, with product display post 200 moving (e.g., flexing, tilting, or both flexing and tilting) away from a stationary vertical position by an angle θ. Referring to FIG. 7B, in the same way as described above with reference to FIGS. 5B and 5C, damping flange 440 tilts in response to the movement of product display post 200 and compresses portions of damping material 430 above and below damping flange 440 on opposite sides of product display post 200. Specifically, a first portion of damping material 430 below damping flange 440 is compressed (at area 432 in FIG. 7B) by damping flange 440 on the same side of damping assembly 400 as the direction in which product display post 200 is tilted away from vertical (the left side in FIG. 7B) and a second portion of damping material 430 above damping flange 440 is compressed (at area 434 in FIG. 7B) by damping flange 440 on the side of damping assembly 400 positioned away from the direction in which product display post 200 is tilted (the right side in FIG. 7B).

As discussed above, by compressing, damping material 430 absorbs energy from flange 440, slowing its motion for its next oscillation. To effect this outcome, damping material 430 may have a high damping coefficient. Damping material 430 may be selected for its damping characteristics such as, for example, damping coefficient, rebound control rate, resiliency, to suit the characteristics of a particular implementation, taking account of characteristics such as displayed product 500 weight, product display post 200 length and flexibility, and height of the space in which damping material 430 is to be disposed.

Figure 8A:
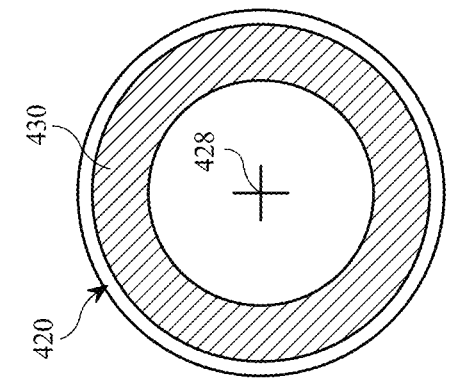
FIGS. 8A-8D and 9A-9D show arrangements for damping material within a damping assembly of the display stand system.
Figure 8B:
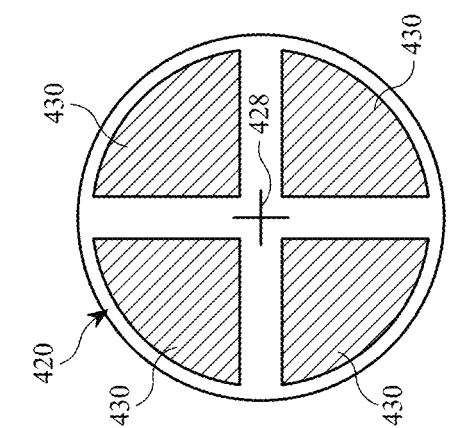
Figure 8C:
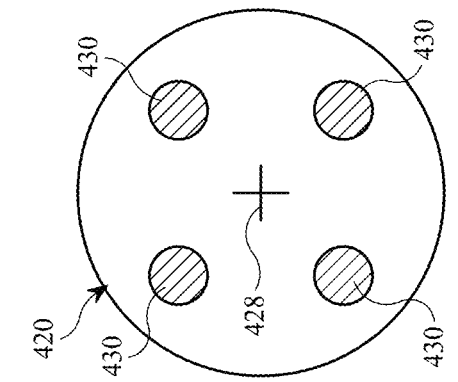
Figure 8D:
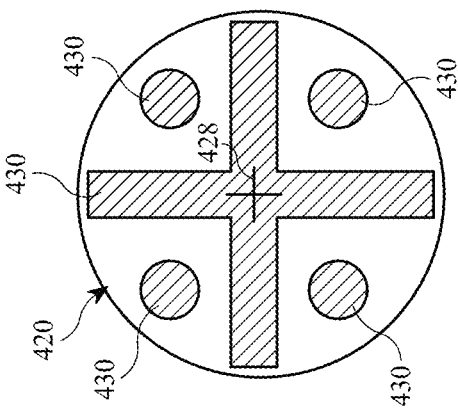
Figure 9A:
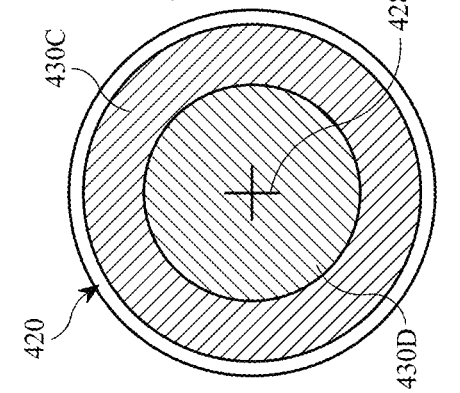
Figure 9B:
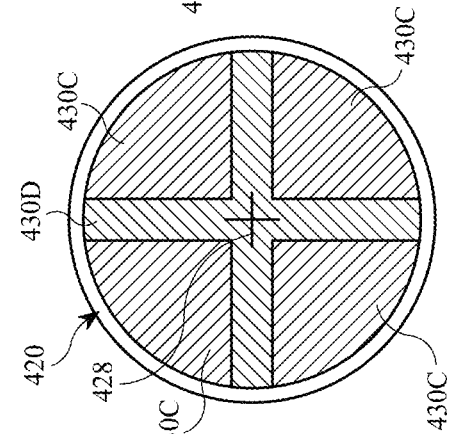
Figure 9C:
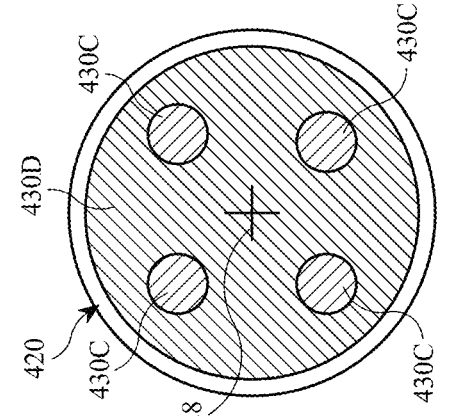
Figure 9D:
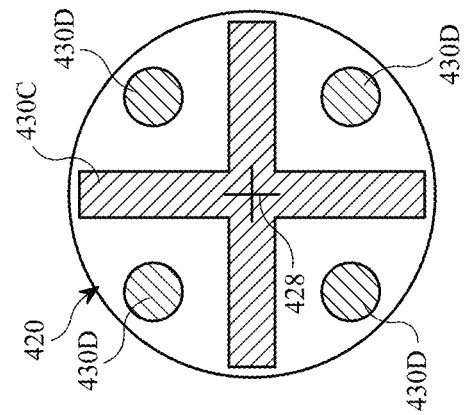

The shape and position of damping material 430 also may be leveraged to help achieve desired damping and movement outcomes for displayed product 500. FIGS. 8A-8D show different potential configurations for damping material 430 within damping chamber 420. FIG. 8A shows damping material element 430 having an annular configuration about a central axis 428 (coinciding with the position of product display post 200), like in FIGS. 6B and 7B. FIGS. 8B-8D show alternative configurations, including an evenly-segmented arrangement with linear gaps (FIG. 8B), a configuration of small, discrete pads (FIG. 8C), and a cross configuration with small, discrete pads (FIG. 8D). The uniform configuration of FIG. 8A may help control oscillation evenly in any direction, while the arrangements of FIGS. 8B-8D may help control the direction of oscillation by arranging damping material 430 and gaps therebetween.

Units of damping material 430 need not be of the same type or have the same damping characteristics. In some embodiments damping material units 430 are different types or have different damping characteristics. FIGS. 9A-9D show different potential configurations for damping material 430C and damping material 430D within damping chamber 420. Damping material 430C is different from damping material 430D in at least its type (e.g., different type of foam), damping characteristics (e.g., different damping coefficient, rebound control rate, and/or resiliency), or thicknesses. The arrangements of FIGS. 9A-9D may help control the direction or degree of oscillation by arranging damping material 430C, damping material 430D, and gaps therebetween.

The damping material arrangements of FIGS. 8A-9D in some embodiments are applied at both an upper side of damping flange 440 within damping chamber 420 and a lower side of damping flange 440 within damping chamber 420. In some embodiments the upper and the lower side have the same arrangement (e.g., the same of one of the arrangements shown in FIGS. 8A-9D or another arrangement), in some embodiments they have different arrangements (e.g., different ones of the arrangements shown in FIGS. 8A-9D or another arrangement).

In some embodiments, damping material 430 may be stacked in layers (e.g., multiple layers of damping material 430 disposed to one side (i.e., above or below) of damping flange 440 between damping flange 440 and an interior surface of damping chamber 420. Such stacked layers may have the same arrangement but different material qualities (e.g., a different material and/or different damping coefficient, rebound control rate, and/or resiliency), or they may have different arrangements with different material qualities. The damping material selection and arrangement can be customized help allow the desired damping effect of display stand system, according to its expected environment (e.g., displayed product 500 weight, product display post 200 height, environment of installation and expected forces to be encountered).

In some embodiments the upper and lower surfaces of damping flange 440 that contact damping material 430 are flat, such that flat surfaces of damping flange 440 press against and compress flat surfaces of damping material units 430 as discussed above. As also discussed above, damping material 430 may be pre-loaded. That is, even in a stationary position of display stand system 100, with displayed product 500 evenly balanced and supported by product display post 200, damping material 430 may be compressed relative to its free, unloaded state. This compression can be caused by pressing together damping material 430 and flange 440 within damping chamber 420 (e.g., damping material 430 may be pre-loaded by being compressed in the vertical direction in fit within a vertical dimension of damping chamber 420). In such a pre-loaded state, the resilience of damping material 430 will press against damping flange 440 (e.g., from above and from below) to help stabilize it and keep it in a stationary position (e.g., with displayed product 500 evenly balanced and supported above by product display post 200). In some embodiments, such upward and downward pressure from damping material 430 will be applied radially around product display post 200 due to damping material 430 being positioned radially around product display post.

Figure 10:
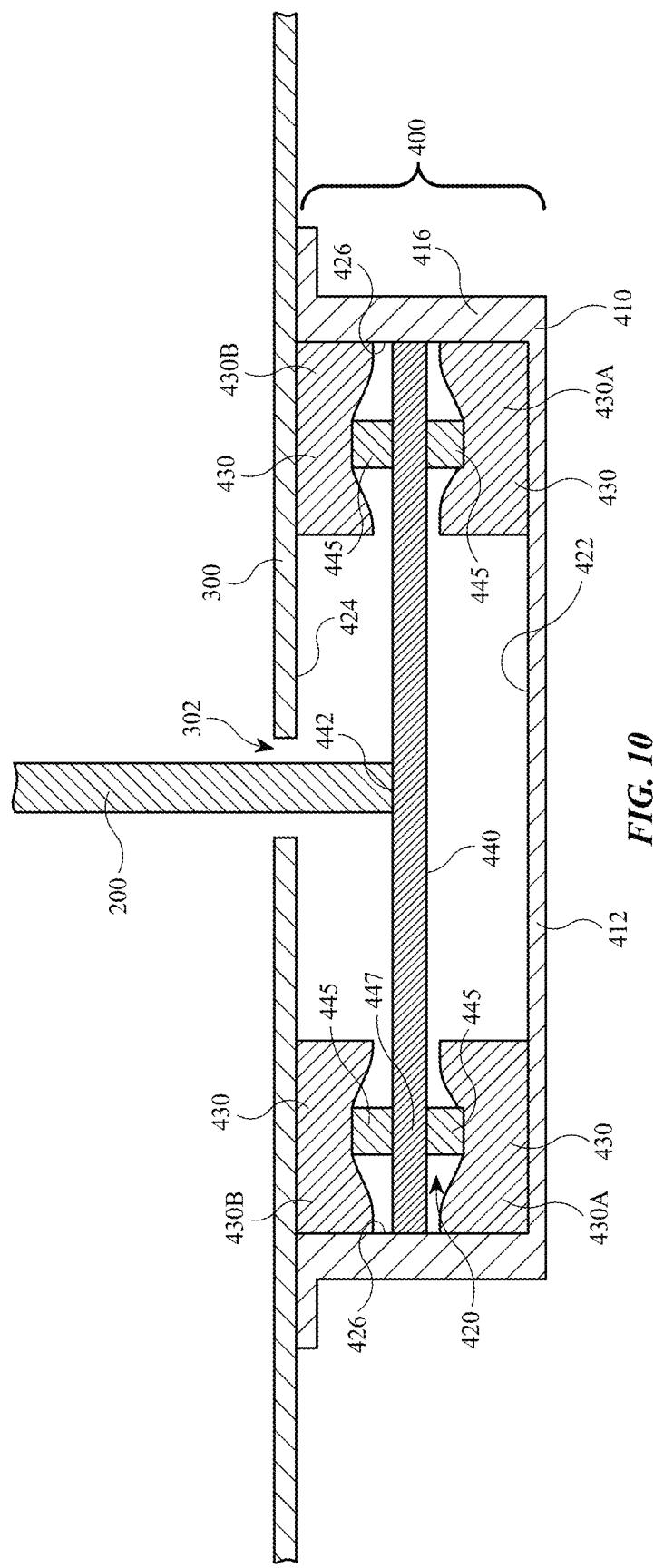
FIG. 10 shows a schematic sectional view of a display stand system including damping feet.

In some embodiments, as shown, for example, in FIG. 10, damping flange 440 may have damping feet 445 extending from a main body 447 (e.g., a main plate 447) of damping flange 440. Main body 447 may be flat (e.g., have flat upper and lower surfaces). Damping feet 445 may be interposed between main plate 447 and damping material 430. Damping feet may have a diameter much smaller than a diameter of main plate 447. For example, a damping foot 445 may have a maximum width (e.g., diameter) that is less than 1/10 a maximum width (e.g., diameter) of main plate 447. In some embodiments damping feet 445 are cylindrical (like damping flange 440 in some embodiments), but can have other shapes. Damping feet 445 may compress damping material 430 in a concentrated manner focused at the positions of damping feet 445, pre-loading damping material 430 in a similar way as discussed above, except that such pre-loading is concentrated at the positions of feet 445.

In some embodiments, feet 445 are distributed radially about a center of main plate 447 (e.g., about the position at which product display post 200 connects to display flange 440, at connection 442 between product display post 200 and main plate 447). FIGS. 11A and 11B show views that can represent both top and bottom sides of display flange 440 with feet 445. As shown in FIG. 11A, four feet 445 can be distributed evenly about central axis 428. As shown in FIG. 11B, three feet can be distributed evenly about central axis 428. In some embodiments the upper and the lower sides of flange 440 have the same arrangement of feet 445 (e.g., the same of one of the arrangements shown in FIG. 11A or 11B or another arrangement), in some embodiments they have different arrangements (e.g., different ones of the arrangements shown in FIG. 11A or 11B or another arrangement).

By concentrating initial compression of 430 using feet 445, display stand system 100 can effect a two-stage damping when displayed product 500 moves (e.g., oscillates) above display platform 300. The first stage is compression of damping material 430 by damping feet 445. The second stage is compression of damping material 430 by main body 447, which presses against damping material 430 after or to a lesser degree than feet 445. Thus, as a consequence of an initial movement of product display post 200 (e.g., due to movement of displayed product 500) damping flange 440 tilts to one side, and damping feet 445 extend deeper into damping material 430, driving greater compression and encountering greater resistance due to the resilience of damping material 430. This is the first stage. As the motion continues and damping flange 440 tilts more, main body 447 of damping flange 440 compresses damping material 430, though not as deeply as at damping feet 445, providing a softer, wider resistance by pressing more shallowly against a greater area of damping material 430. This is the second stage.

The first stage can be useful for quickly absorbing energy and thereby reducing motion below a threshold magnitude, while the second stage can be useful for absorbing energy and thereby reducing motion above the threshold, thereby bringing it down beneath the threshold so that it can be absorbed by the first stage. Thus, the first stage focuses compression more deeply in a concentrated area, while the second stage spreads compression more widely and shallowly. This two-stage damping arrangement helps to bring even relatively larger forces and movement down quickly, by allowing the second stage to engage and dampen relatively larger forces and relatively smaller forces in different ways, allowing the damping effect of display stand system 100 to be tailored to most effectively absorb energy and reduce oscillation according to its expected environment (e.g., displayed product 500 weight, product display post 200 height, environment of installation and expected forces to be encountered).

In some embodiments, damping flange 440 and damping material 430 are retained in position relative to each other simply by their constricted motion due to being contained within damping chamber 420. (And in the case where damping material 430 is pre-loaded, forces between damping material 430, damping flange 440, and damping assembly housing 410 due to the compression of damping material 430 can help maintain their relative positions.) However, in some embodiments, an adhesive 438 may be applied between damping material 430 and other portions of damping assembly 400 (e.g., between damping material 430 and damping flange 440, and/or between damping material 430 and surfaces defining damping chamber 420).

FIGS. 12A-12E show some example configurations of adhesive 438 relative to damping flange 440. FIGS. 12A-12E show views that can represent both top and bottom sides of display flange 440. Such adhesive example configurations may also be applied between damping material 430 and surfaces defining damping chamber 420.

Figure 12B:
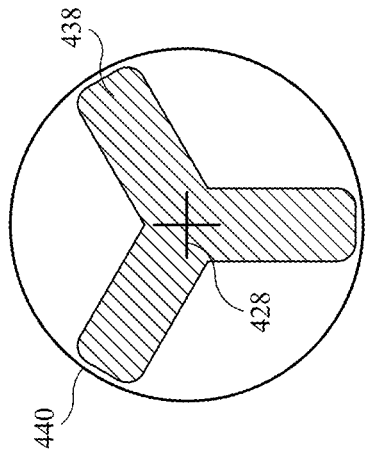
FIGS. 12A-12E show arrangements for adhesives between components of the damping assembly.
Figure 12E:
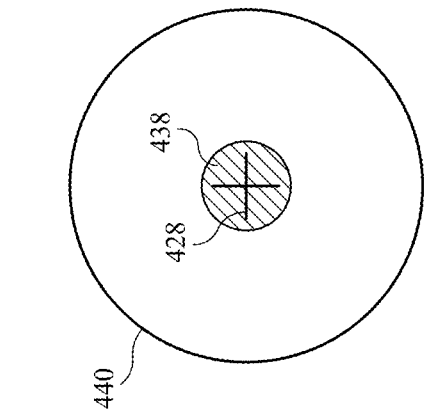
Figure 12A:
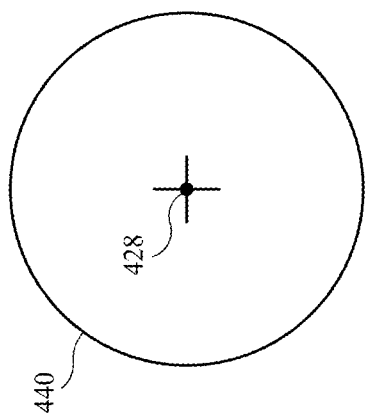
Figure 12D:
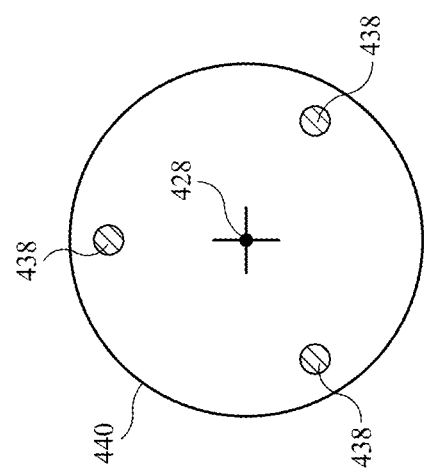
Figure 12C:
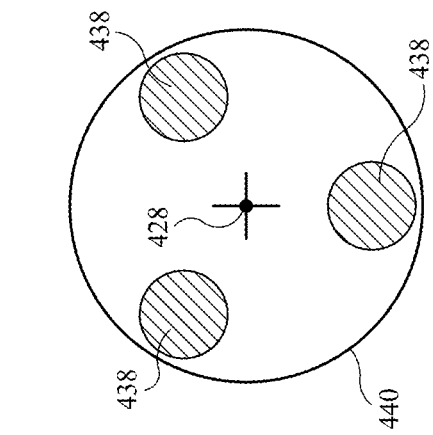

FIG. 12A shows no adhesive being used. FIG. 12B shows adhesive 438 radially branching out from central axis 428. FIGS. 12C and 12D show adhesive circles evenly radially spaced about central axis 428. The circles of FIG. 12C are all the same size. The circles of FIG. 12D are also all the same size, but smaller than those of FIG. 12C. FIG. 12E shows a single circle adhesive 438 centered on central axis 428. Such adhesive 438 may be applied to ends of feet 445 in embodiments in which feet 445 are used.

As mentioned, the adhesive configurations of FIGS. 12A-12E may be interposed between damping material 430 and another element, to help fix the adhered elements together and retain their relative positions. For example, they can be disposed between damping material 430 and damping flange 440, between damping material 430 and interior surfaces of damping chamber 420, between different layers of damping material 430, or any combination thereof.

In some embodiments adhesive 438 between different elements can have the same arrangement, in the same or different orientation about central axis 428, (e.g., the same of one of the arrangements shown in FIGS. 12A-12E or another arrangement). In some embodiments they have different arrangements (e.g., different ones of the arrangements shown in FIGS. 12A-12B or another arrangement).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A product display stand for reducing displayed product movement, the product display stand comprising:
a damping assembly configured to directly attach to a first side of a display platform, the damping assembly comprising:
a damping assembly housing configured to attach to the display platform, the damping assembly housing defining a damping chamber;
a damping flange disposed within the damping chamber; and
damping material disposed between the damping flange and walls of the damping chamber; and
a display post fixed to the damping flange, the display post extending from the damping flange to outside of the damping chamber, the display post configured to extend through the display platform and away from a second side of the display platform opposite the first side, and to retain and display a product.

2. The product display stand of claim 1, wherein the damping material comprises an upper damping material unit and a lower damping material unit,
wherein the lower damping material unit rests on a lower wall of the damping chamber,
wherein the damping flange rests on the lower damping material unit, and
wherein the upper damping material unit is positioned at an opposite side of the damping flange as is the lower damping material unit.

3. The product display stand of claim 2, wherein the damping material is foam.

4. The product display stand of claim 1, wherein the damping chamber has a height, and wherein the damping flange and the damping material together have a height equal to the damping chamber height.

5. The product display stand of claim 1, wherein the damping chamber has a height, and wherein the damping flange and the damping material together have a height greater than the damping chamber height in an unloaded configuration.

6. The product display stand of claim 1, wherein the damping material is resilient, and is more compressible than the damping flange.

7. The product display stand of claim 1, wherein the display post is fixed to the damping flange at a center of the damping flange.

8. The product display stand of claim 1, wherein the display post is removably fixed to the damping flange.

9. The product display stand of claim 1, wherein in response to a force applied to the display post, the damping flange is configured to compress a first portion of the damping material disposed between the damping flange and a lower wall of the damping assembly housing, and to compress a second portion of the damping material disposed between the damping flange and the display platform, wherein the first portion of the damping material and the second portion of the damping material are disposed opposite each other about the display post.

10. The product display stand of claim 1, wherein the damping material is compressed in a stationary configuration.

11. The product display stand of claim 1, wherein the damping flange comprises damping feet protruding therefrom, the damping feet compressing the damping material to a greater extent than other areas of the damping flange compress the damping material.

12. A product display stand for reducing displayed product movement, the product display stand comprising:
a damping assembly configured to attach to a display platform, the damping assembly comprising:
a damping assembly housing configured to attach to the display platform, the damping assembly housing defining a damping chamber;
a damping flange disposed within the damping chamber; and
damping material disposed between the damping flange and walls of the damping chamber; and
a display post fixed to the damping flange, the display post extending from the damping flange to outside of the damping chamber, the display post configured to extend to an opposite side of the display platform and to retain and display a product,
wherein a lower wall of the damping assembly housing defines an opening therethrough,
wherein the damping flange has a diameter larger than a diameter of the opening, and
wherein a portion of the damping material is disposed between the flange and the lower wall around the opening.

13. The product display stand of claim 12, wherein the damping flange comprises a protruding portion extending through the opening.

14. The product display stand of claim 12, wherein a lower end of the display post is accessible through the opening.

15. The product display stand of claim 12, wherein the display post comprises an attachment member, and wherein the attachment member is received in and couples to a portion of the damping flange protruding through the opening.

16. A product display system for reducing product oscillation, the product display system comprising:
a retail display fixture comprising a display platform defining an opening therethrough, the retail display fixture configured to support displayed products disposed on or above the display platform; and
a display stand comprising:
a damping assembly attached to an underside of the display platform at the opening; and
a display post extending from the damping assembly through the display platform to a position above the display platform, the display post configured to retain a displayed item above the display platform,
wherein the damping assembly absorbs forces applied to the display post to diminish movement of the display post by transmitting the forces to foam within the damping assembly through compression of the foam.

17. The product display system of claim 16, wherein as the display post oscillates due to forces applied to the display post, a damping flange of the damping assembly tilts back and forth to transmit the forces to the foam and thereby diminish the oscillation of the display post.

18. The product display system of claim 16, wherein the display post is rigidly coupled to a damping flange contained within a damping chamber of the damping assembly, and
wherein the damping flange is held within the damping chamber by a housing of the damping assembly, and is not directly attached to the display platform.

19. The product display system of claim 16, wherein the damping assembly is not visible from above the display platform.

20. The product display system of claim 16, wherein the display post is at least 50 times longer than a diameter of the display post.

21. The product display system of claim 16, wherein the display post is at least 100 times longer than a diameter of the display post.

22. The product display system of claim 16, wherein the retail display fixture comprises a plurality of openings therethrough, and
wherein the product display system comprises a plurality of the display stands, the display post of each display stand extending through one of the openings.

23. A method for reducing movement of a product displayed on a display stand, the method comprising:
in response to a force applied to the product, transferring the force through a display post to a damping chamber disposed below a display platform;
absorbing the force by compressing resilient damping material within the damping chamber using movement of a structure disposed within the damping chamber and fixed to the display post, wherein the resilient damping material comprises a first damping material and a second damping material, wherein the second damping material has a different damping characteristic from the first damping material; and
repeating the absorbing step until the product is still,
wherein the first damping material and the second damping material are disposed on the same lateral side of the structure relative to the display post.

24. The method of claim 23, wherein each repeating step alternates a position at which the resilient damping material is compressed.

25. The method of claim 23, wherein the damping material is compressed in a direction perpendicular to the direction of the force applied to the product.

26. The method of claim 23, wherein the first absorbing step comprises compressing a first portion of the damping material and simultaneously compressing a second portion of the damping material, wherein the second portion of the damping material is compressed in a direction parallel to and opposite of the direction in which the first portion of the damping material is compressed,
wherein the second absorbing step comprises compressing a third portion of the damping material and simultaneously compressing a fourth portion of the damping material, wherein the fourth portion of the damping material is compressed in a direction parallel to and opposite of the direction in which the third portion of the damping material is compressed, and
wherein the structure is a damping flange, and wherein the first and third portions of the damping material are disposed on opposite sides of the damping flange from the second and fourth portions of the damping material.

27. The method of claim 23, wherein the characteristic is at least one of a damping coefficient, a rebound control rate, and a resiliency.

* * * * *